United States Patent [19]
Kikuchi et al.

[11] Patent Number: 5,898,773
[45] Date of Patent: Apr. 27, 1999

[54] TELEPHONE APPARATUS WITH CALL TRANSFER FUNCTION AND WITH IMPROVED ARRANGEMENT FOR HAND-FREE OPERATION

[75] Inventors: Kenichi Kikuchi, Fukuoka; Kazunari Tsunoda, Chikushino; Kouichi Yamamoto, Kasuga, all of Japan

[73] Assignee: Matsushita Electric Industrial Co., Ltd., Osaka, Japan

[21] Appl. No.: 08/959,444

[22] Filed: Oct. 28, 1997

[30] Foreign Application Priority Data

Oct. 29, 1996 [JP] Japan .................................. 8-286344

[51] Int. Cl.⁶ .............................. H04M 1/58; H04M 1/60
[52] U.S. Cl. ......................... 379/390; 379/156; 379/212; 379/420; 379/392
[58] Field of Search ..................................... 379/387, 390, 379/395, 381, 406, 410, 391, 392, 156, 420, 202, 206, 204, 207, 199, 212, 211

[56] References Cited

U.S. PATENT DOCUMENTS

| | | | |
|---|---|---|---|
| 4,125,748 | 11/1978 | Nahabedian et al. | 379/158 |
| 5,001,744 | 3/1991 | Nishino et al. | 379/93.09 |
| 5,034,978 | 7/1991 | Nguyen et al. | 379/402 |
| 5,357,567 | 10/1994 | Barron et al. | 379/390 |
| 5,414,763 | 5/1995 | Hirata | 379/201 |
| 5,668,794 | 9/1997 | McCaslin et al. | 370/288 |
| 5,692,042 | 11/1997 | Sacca | 379/387 |

FOREIGN PATENT DOCUMENTS

| | | |
|---|---|---|
| 6-260972 | 9/1994 | Japan . |
| 8-508384 | 9/1996 | Japan . |

*Primary Examiner*—Daniel S. Hunter
*Assistant Examiner*—Charles N. Appiah
*Attorney, Agent, or Firm*—Venable; Robert J. Frank; Allen Wood

[57] ABSTRACT

A telephone apparatus is connected to a plurality of telephone lines and has a transfer function for transferring a call among the plurality of telephone lines. The telephone apparatus includes circuit interfaces each of which has a 2–4 line substitution function and conducts an interface function between each of the plurality of telephone lines and a telephone apparatus internal circuit. A first amplifier amplifies a signal from a first telephone line and a second amplifier amplifies a signal from a second telephone line. A control unit compares the levels of the signals from the first and second telephone lines to control the amplification factors of the first and second amplifiers on the basis of a result of the comparison.

10 Claims, 6 Drawing Sheets

TELEPHONE APPARATUS WITH CALL TRANSFER FUNCTION AND WITH IMPROVED ARRANGEMENT FOR HAND-FREE OPERATION

BACKGROUND OF THE INVENTION

1. Field of the Invention

The present invention relates to a telephone apparatus, and more particularly relates to a telephone apparatus to which a plurality of telephone lines are connected and which has a transfer function at the time of a call between telephone sets.

2. Description of the Related Art

In general, a telephone apparatus with a transfer function is connected to a plurality of telephone sets as shown in FIG. 3 in the case where it is used in a tandem manner in an office. The operation of a telephone apparatus S when a telephone set P calls to the telephone apparatus S will be explained. When a dial signal based on a phone number which designates the telephone apparatus S is output from the telephone set P, a switching system Ex1 sends a ring signal to the telephone apparatus S, so that a speech path is formed between the telephone set P and the telephone apparatus S.

For the transfer, the telephone apparatus S sends a dial signal which designates a telephone set Q, so that a speech path is formed between the telephone apparatus S and the telephone set Q. Moreover, a speech path is formed between the telephone set on the side of a calling person (i.e. the telephone set P) and the telephone set on side of a called person (i.e. the telephone set Q). In other words, the telephone set P on the side of the calling person is connected to the telephone apparatus S with a transfer function through a switching system Ex2 and a switching system Ex1 by a public telephone line, and the telephone set Q on the side of the called person is connected to the telephone apparatus S with a transfer function through a switching system Ex3 and the switching system Ex1 by a public telephone line. A call between the telephone set P and the telephone set Q is produced by connecting the telephone set P and the telephone set Q with the telephone apparatus S.

By the way, the level of the call between such line wires becomes smaller than that of a call between two persons due to the circuit loss between the switching system Ex1 and the telephone apparatus S. If the damped signal is amplified by an amplifier, a loop is formed. Therefore, the signal return to the amplifier occurs, causing oscillation.

SUMMARY OF THE INVENTION

An object of the present invention is to provide a telephone apparatus with a transfer function which can compensate for the circuit lass, can damp the signal return to the amplifier, and can prevent an increase of a side-tone and the oscillation.

To achieve the object mentioned above, the present invention relates to a telephone apparatus which is connected to a plurality of telephone lines and has a transfer function which is used as a tandem office at the time of a call between telephone sets, and which comprises means for compensating a circuit loss.

In detail, a first telephone apparatus according to the present invention comprises: a first amplifier for amplifying a signal from a first telephone line; a second amplifier for amplifying a signal from a second telephone line; and control means for comparing levels of the signals from the first and second telephone lines to control amplification factors of the first and second amplifiers on the basis of a result of the comparison.

In the first telephone apparatus according to the present invention having such a constitution, the level of the signal amplified by the first amplifier and the level of the signal amplified by the second amplifier are compared. When the former is larger than the latter, for example, the first amplifier is actuated and the second amplifier is not actuated.

A second telephone apparatus according to the present invention comprises: a first attenuator for damping a signal returning after reflecting in a first circuit interface; a second attenuator for damping a signal returning after reflecting in a second circuit interface; and control means for comparing levels of the signals from the first and second telephone lines to control the first and second attenuators to actuate selectively on the basis of the result of the comparison.

In the second telephone apparatus according to the present invention having such a constitution, as the attenuator is inserted to a signal path which relates to the amplifier in the non-actuating state, it is possible to damp the return quantity of the signal and to prevent the increase of the side-tone and the oscillation.

A third telephone apparatus according to the present invention comprises: speech input/output means for enabling a hand free call; change-over means having a change-over function for changing over a speech path in the free hand call mode so as to send the signal amplified by the first amplifier to the speech output means and to send a signal from the speech input means to the second amplifier, and for changing over said speech path in a transfer mode so as to send the signal amplified by the first amplifier to the second telephone line and to send the signal from the second telephone line to the second amplifier; first echo cancellation means for generating a first cancellation signal for canceling a first return signal when a part of the signal amplified by the first amplifier returns; second echo cancellation means for generating a second cancellation signal for canceling a second return signal when a part of the signal amplified by the second amplifier returns; and control means for controlling as follows: (a) to compare a level of the signal input to the first amplifier and a level of the signal input to the second amplifier; (b) to set, in the hand free call mode, an amplification factor of one of the first and second attenuators, which is on a side of a speech path in which the level of the signal is larger, to A, and to set an amplification factor of the other amplifier to a value lower than A; and (c) to set, in the transfer mode, an amplification factor of one of said first and second attenuators, which is on a side of a speech path in which the level of the signal is larger, to C, and to set an amplification factor of the other amplifier to a value lower than C.

In the third telephone apparatus according to the present invention having such a constitution, it is possible to intend the share of a circuit and to put the hand free call and transfer functions in practice without enlarging a circuit scale.

A fourth telephone apparatus according to the present invention comprises: control means for controlling as follows: (a) to set, in the hand free call mode, amplification factors of the first and second attenuators to A and b, respectively when a level of the signal input to the first amplifier is larger, and to set the amplification factors of the first and second amplifiers to a and B, respectively when a level of the signal input to the second amplifier is larger; and (b) to set, in the transfer mode, the amplification factors of the first and second attenuators to C and d, respectively when the level of the signal input to the first amplifier is larger, and to set the amplification factors of the first and second amplifiers to c and D, respectively when the level of the signal input to the second amplifier is larger.

In the fourth telephone apparatus according to the present invention having such a constitution, it is possible to set the optimal amplification factors in the hand free call and transfer modes and to put a stable operation in practice.

DETAILED DESCRIPTION OF THE PREFERRED EMBODIMENTS (First Embodiment)

A telephone apparatus according to a first embodiment of the present invention will be explained referring to FIGS. 1 and 2.

Figure 1:
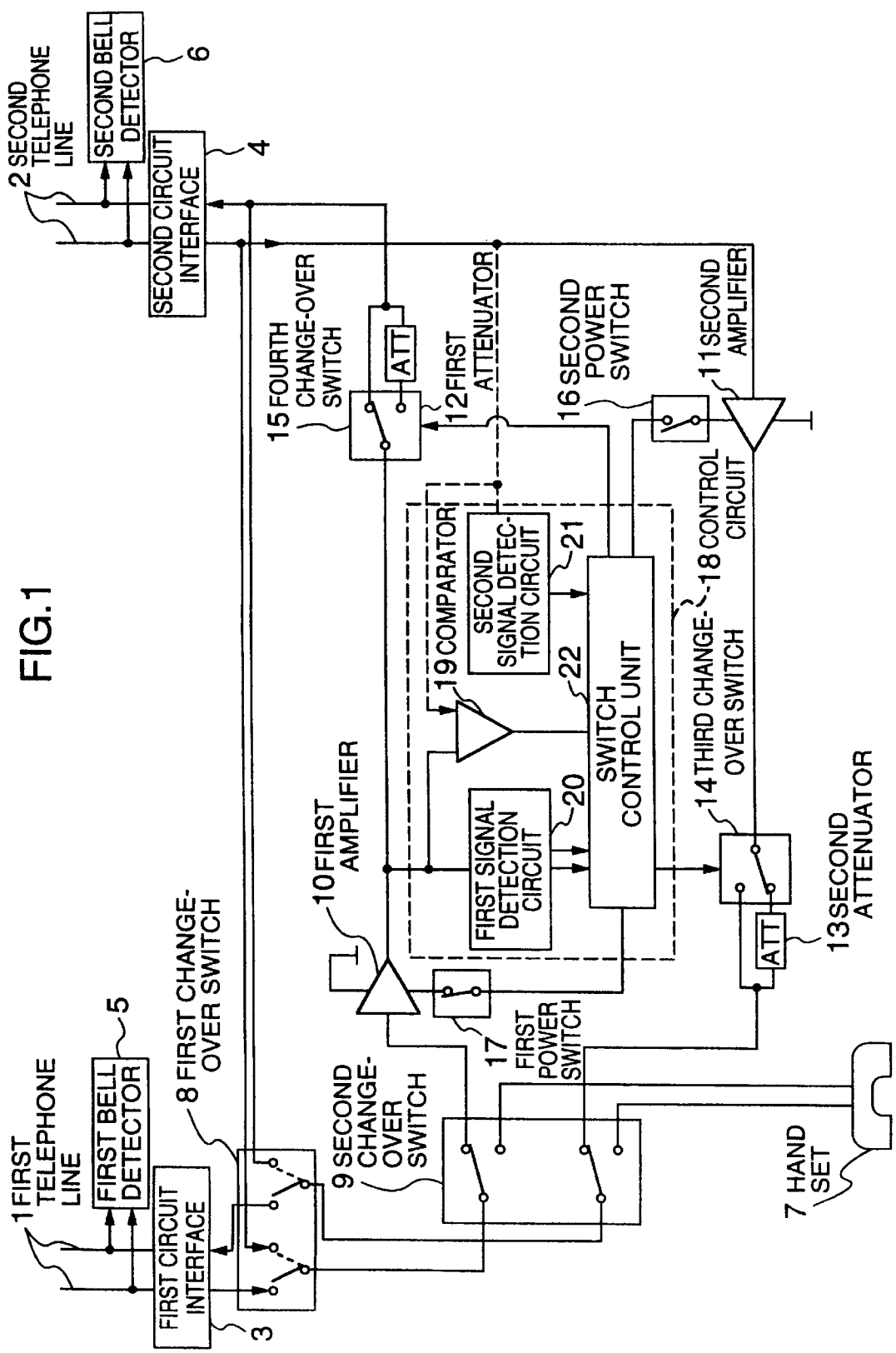
FIG. 1 is a block diagram which shows the constitution of a principal part of a telephone apparatus according to a first embodiment of the present invention.

In FIG. 1, reference numerals 1 and 2 denote first and second telephone lines, respectively. Reference numerals 3 and 4 denote first and second circuit interfaces, respectively. The first circuit interface 3 opens or closes the first telephone line 1. The second circuit interface 4 opens or closes the second telephone line 2. Each of the first and second circuit interfaces 3 and 4 has a 2–4 line substitution function and has an interface function with a telephone apparatus internal circuit. Reference numeral 5 denotes a first bell detector which detects a first ring signal from the first telephone line 1. Reference numeral 6 denotes a second bell detector which detects a second ring signal from the second telephone line 2. Reference numeral 7 denotes a hand set for a speech call. Reference numeral 8 denotes a first change-over switch which changes over speech paths between a call using the first telephone line 1 and a call using the second telephone line 2. Reference numeral 9 denotes a second change-over switch which changes over speech paths between a call using the hand set 7 and a connection between the first and second telephone lines 1 and 2 using a transfer circuit.

The transfer function of the telephone apparatus according to the present embodiment will now be explained. In FIG. 1, reference numeral 10 denotes a first amplifier which amplifies a signal from the second change-over switch 9, and reference numeral 11 denotes a second amplifier which amplifies a signal from the second circuit interface 4. Reference numeral 12 denotes a first attenuator which damps a signal returning to the first amplifier 10 after reflecting in the second circuit interface 4. Reference numeral 13 denotes a second attenuator which damps a signal returning to the second amplifier 11 after reflecting in the first circuit interface 3. Reference numeral 14 denotes a third change-over switch which changes over the connection of the second amplifier 11 and the second change-over switch 9 directly or through the second attenuator 13. Reference numeral 15 denotes a fourth change-over switch which changes over the connection of the first amplifier 10 and the second circuit interface 4 directly or through the first attenuator 12. Reference Numeral 17 denotes a first power switch for the first amplifier 10. Reference numeral 16 denotes a second power switch for the second amplifier 11.

Reference numeral 18 denotes a control circuit. The control circuit 18 is composed in the following manner. The control circuit 18 includes a comparator 19 which compares the level of the signal from the first telephone line 1 and the level of the signal from the second telephone line 2, a first signal detection circuit 20 which detects the signal from the first telephone line 1, a second signal detection circuit which detects the signal from the second telephone line 2, and a switch control unit 22 which controls the first and second power switches 17 and 16 and the third and fourth change-over switches 14 and 15.

The operation of the telephone apparatus of the present will now be explained. It is assumed that the second change-over switch 9 is in a condition in which the transfer path is connected between the first and second telephone lines 1 and 2 as shown in FIG. 1. A signal in a reception direction and a signal in a transmission direction are transmitted on the first and second telephone lines 1 and 2. The signal in the reception direction and the signal in the transmission direction are separated in the first and second circuit interfaces 3 and 4 each of which has the 2–4 line substitution function.

In the initial state, the first and second power switches 17 and 16 are controlled to be in the ON-state by the switch control unit 22, SO that the first and second amplifiers 10 and 11 are in an actuated state. Further, the third change-over switches 14 is controlled by the switch control unit 22 so as to connect the second amplifier 11 to the second change-over switch 9 not through the second attenuator 13 but directly. The fourth change-over switch 15 is controlled by the switch control unit 22 so as to connect the first amplifier 10 to the second circuit interface 4 not through the first attenuator 12 but directly.

When neither a signal from the first telephone line 1 nor a signal from the second telephone line 2 can be detected by the first and second signal detection circuits 20 and 21, the control circuit 18 controls the first and second power switches 17 and 16 to be in the ON-state so that the first and second amplifiers 10 and 11 are in the actuated state. When a signal from the first telephone line 1 and/or a signal from the second telephone line 2 can be detected by the first and second signal detection circuits 20 and 21, their levels are compared in the comparator 19 of the control circuit 18.

It is now assumed that a reception signal is input through the first telephone line 1 and the second telephone line 2 is in a silent condition. The control circuit 18 controls the second power switch 16 to be in the OFF-state, so that the second amplifier 11 is in the non-actuated state. On the other hand, the first power switch 17 is controlled to be in the ON-state, so that the first amplifier 10 maintains the actuated state. However, even though the second amplifier 11 is in the non-actuated state, the level of the signal returning from the second circuit interface 4 to the first telephone line 1 is large. As a result, the third change-over switch 14 is controlled by the switch control unit 22 so as to connect the second amplifier 11 to the second change-over switch 9 through the second attenuator 13. Consequently, the signal returning from the second circuit interface 4 to the first telephone line 1 is damped by the second attenuator 13. The signal which is input through the first telephone line 1 is amplified in the first amplifier 10 only by an added loss (i.e. the circuit loss from the switching system Ex1 to the telephone apparatus S shown in FIG. 3), and then is sent to the second telephone line 2 through the fourth change-over switch 15 and the second circuit interface 4.

When there is no reception signal from the first telephone line 1, the switch control unit 22 judges on the basis of an output signal of the first signal detection circuit 20 that there is no input signal from the first telephone line 1. Then, the switch control unit 22 controls the second power switch 16 to be in the ON-state, so that the second amplifier 11 is in the actuated state. Further, the switch control unit 22 controls the third change-over switch 14 to connect the second amplifier 11 to the second change-over switch 9 not through the second attenuator 13 but directly. As a result, the telephone apparatus is changed to be in the initial state.

Figure 2:
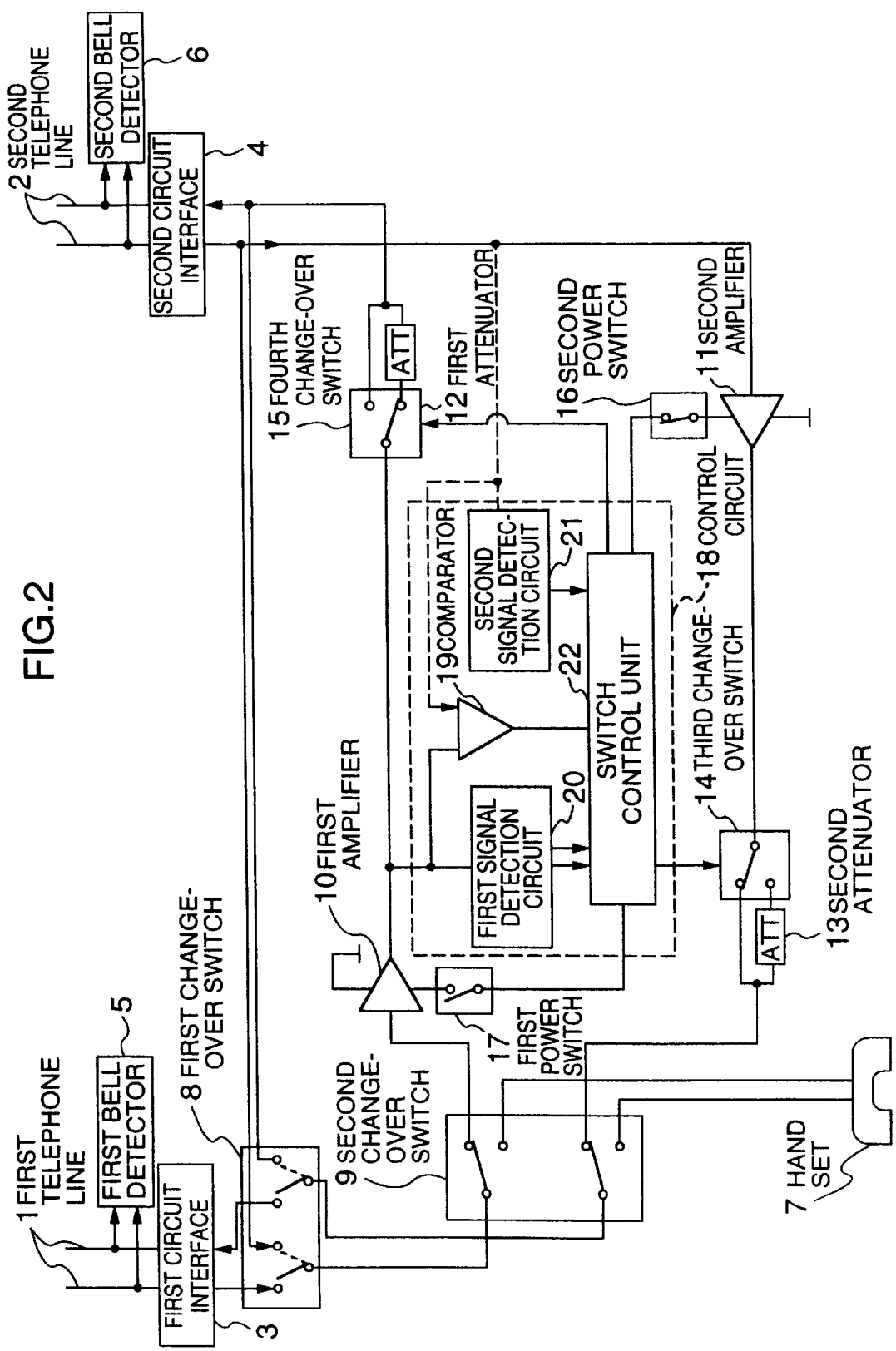
FIG. 2 is a block diagram which shows the principal part of the telephone apparatus shown in FIG. 1 when a first power switch 17 is opened and a second power switch 16 is closed.

When a reception signal is input through the second telephone line 2, the switch control unit 22 controls the first power switch 17 to be in the OFF-state on the basis of an output signal of the comparator 19, so that the first amplifier 10 is in the non-actuated state, as shown in FIG. 2. The second power switch 16 maintains the ON-state, so that the second amplifier 11 maintains the operating state. Further, the switch control unit 22 controls the fourth change-over switch 15 to connect the first amplifier 10 to the second circuit interface 4 through the first attenuator 12, so that a signal returning from the first circuit interface 3 to the second telephone line 2 is damped in the first attenuator 12. And then, if there is no reception signal input through the second telephone line 2, the switch control unit 22 judges it to be in the silent condition on the basis of an output signal of the second signal detection circuit 21, so that the telephone apparatus is changed to be in the initial state.

In an actual call, the operation from the silent detection to the waiting condition is carried out at a high speed, and the reception signal input through the first telephone line 1 and the reception signal input through the second telephone line 2 are alternately amplified and output.

As it becomes clear by the aforementioned explanation, the telephone apparatus according to the present embodiment is a telephone apparatus with a transfer function which includes compensation means for compensating for the circuit loss due to the added circuit and has an advantageous effect in that it is possible to make the added circuit loss 0 dB at the time of the transfer function circuit operation. As a result, it is possible to secure a call level equivalent to that of a call between two persons.

(Second Embodiment)

A telephone apparatus according to a second embodiment of the present invention will be explained referring to FIG. 4.

Figure 4:
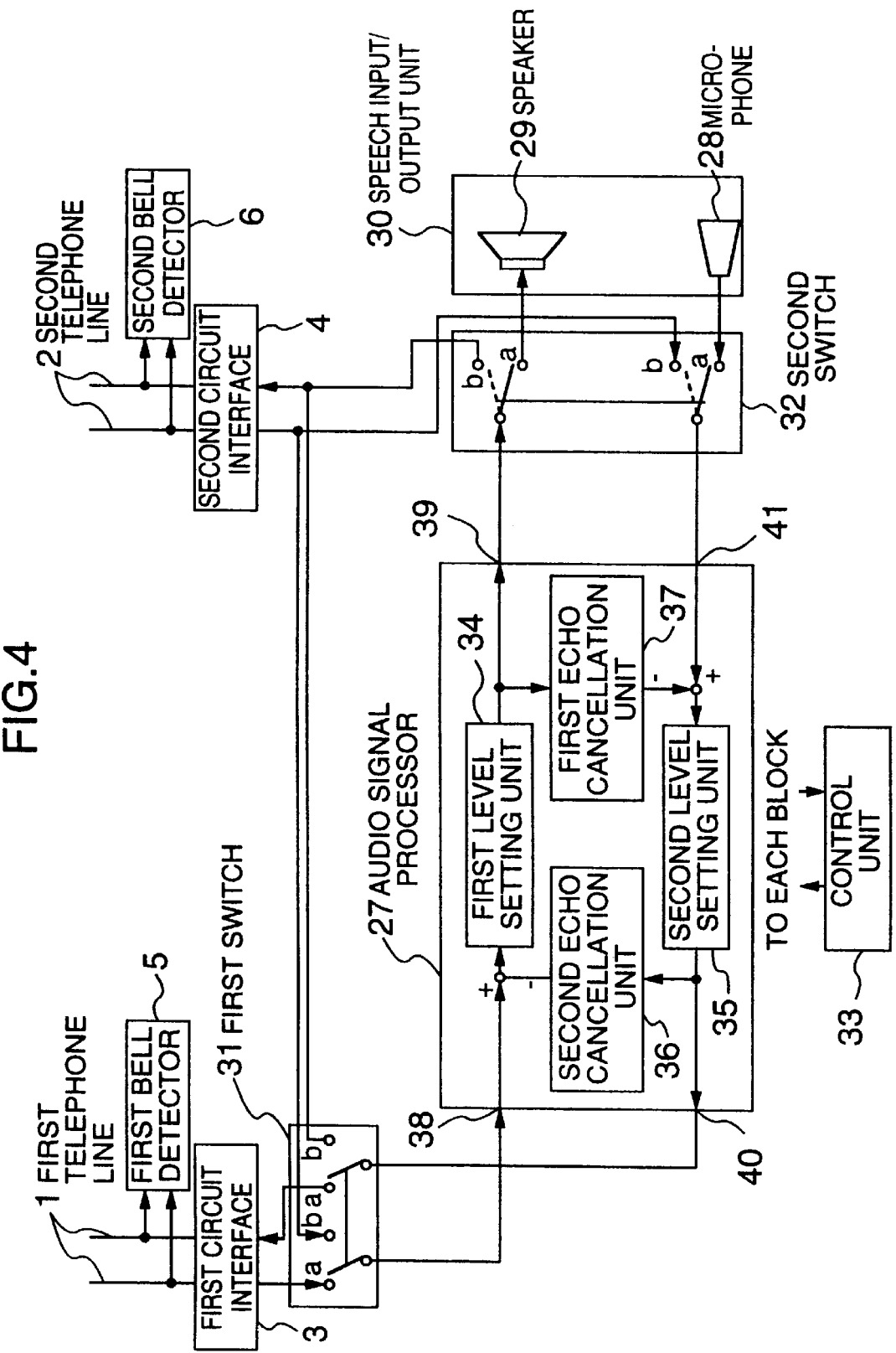
FIG. 4 is a block diagram which shows the constitution of a principal part of a telephone apparatus according to a second embodiment of the present invention.

In FIG. 4, reference numerals 1 and 2 denote first and second telephone lines, respectively. Reference numerals 3 and 4 denote first and second circuit interfaces, respectively, each of which conducts an interface function. Reference numeral 5 denotes a first bell detector which detects a ring signal from the first telephone line 1. Reference numeral 6 denotes a second bell detector which detects a ring signal from the second telephone line 2. All of them may have constitutions which are similar to those of the first embodiment mentioned above.

Reference numeral 27 denotes an audio signal processor (the details of it are described later). Reference numeral 28 denotes a microphone provided as a speech-input means into which an operator can speak from a location that is separated from the microphone. Reference numeral 29 denotes a speaker provided as a speech-output means which can be heard even at the separated location. A speech input/output unit 30 is composed of the microphone 28 and the speaker 29.

Reference numeral 31 denotes a first switch by which the first telephone line 1 and the second telephone line 2 are selectively connected to the audio signal processor 27. Reference numeral 32 denotes a second switch provided as a change-over means by which the connection of the second telephone line 2 to the audio signal processor 27 and the connection of the microphone 28 and speaker 29 to the audio signal processor 27 are selectively changed over. Reference numeral 33 denotes a control unit which controls the telephone apparatus.

The audio signal processor 27 includes a first level setting unit 34 with an amplification/damping function for amplifying/damping a signal input from the first switch 31, and a second level setting unit 35 with an amplification/damping function amplifying/damping a signal input from the second switch 32.

Reference numeral 38 denotes a first signal input terminal to which the signal from the first telephone line 1 or the signal from the second telephone line 2 is input. Reference numeral 39 denotes a first signal output terminal from which an output signal of the first level setting unit 34 is output to the second telephone line 2 or the speaker 29. Reference numeral 40 denotes a second signal output terminal from which an output signal of the second level setting unit 35 is output to the first telephone line 1 or the second telephone line 2. Reference numeral 41 denotes a second signal input terminal to which the signal from the second telephone line 2 or a signal from the microphone 28 is input.

Reference numeral 36 denotes a second echo cancellation unit which cancels an echo on the side of the first switch 31. A part of the signal, which is amplified by the second level setting unit 35 and is output from the second signal output terminal 40, sometimes reflects in the first circuit interface 3. Thereupon, the second echo cancellation unit 36 generates a cancellation signal which cancels the return signal. The cancellation signal is added to the signal coming from the first signal input terminal 38.

Reference numeral 37 denotes a first echo cancellation unit which cancels an echo on the side of the second switch 32. A part of the signal, which is amplified by the first level setting unit 34 and is output from the first signal output terminal 39, sometimes reflects in the second circuit interface 4 or sometimes returns after going around from the speaker 29 to the microphone 28. Thereupon, the first echo cancellation unit 37 generates a cancellation signal which cancels the return signal. The cancellation signal is added to the signal coming from the second signal input terminal 41.

Figure 3:
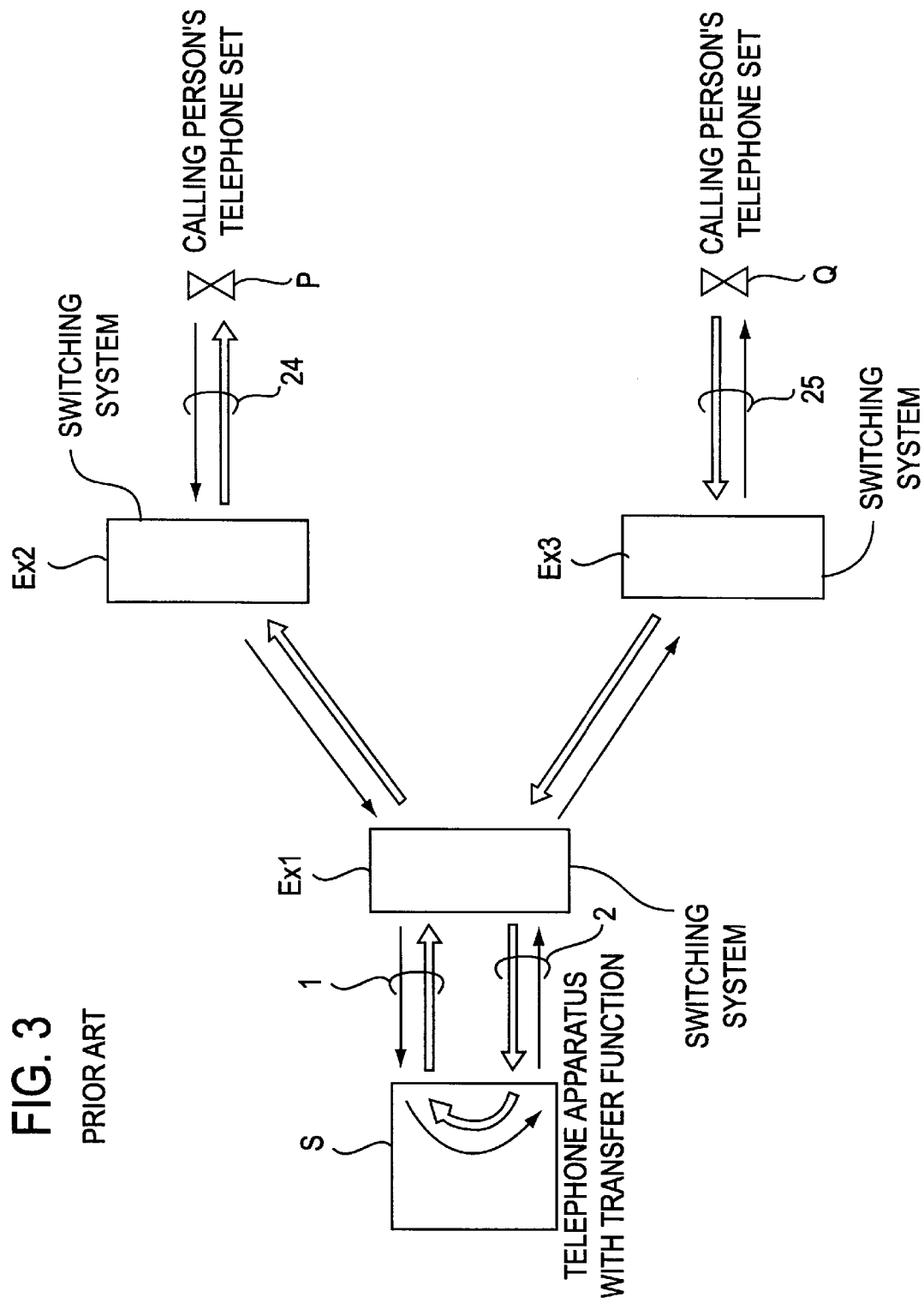
FIG. 3 is a block diagram which shows telephone lines at the time of transfer.
Figure 5:
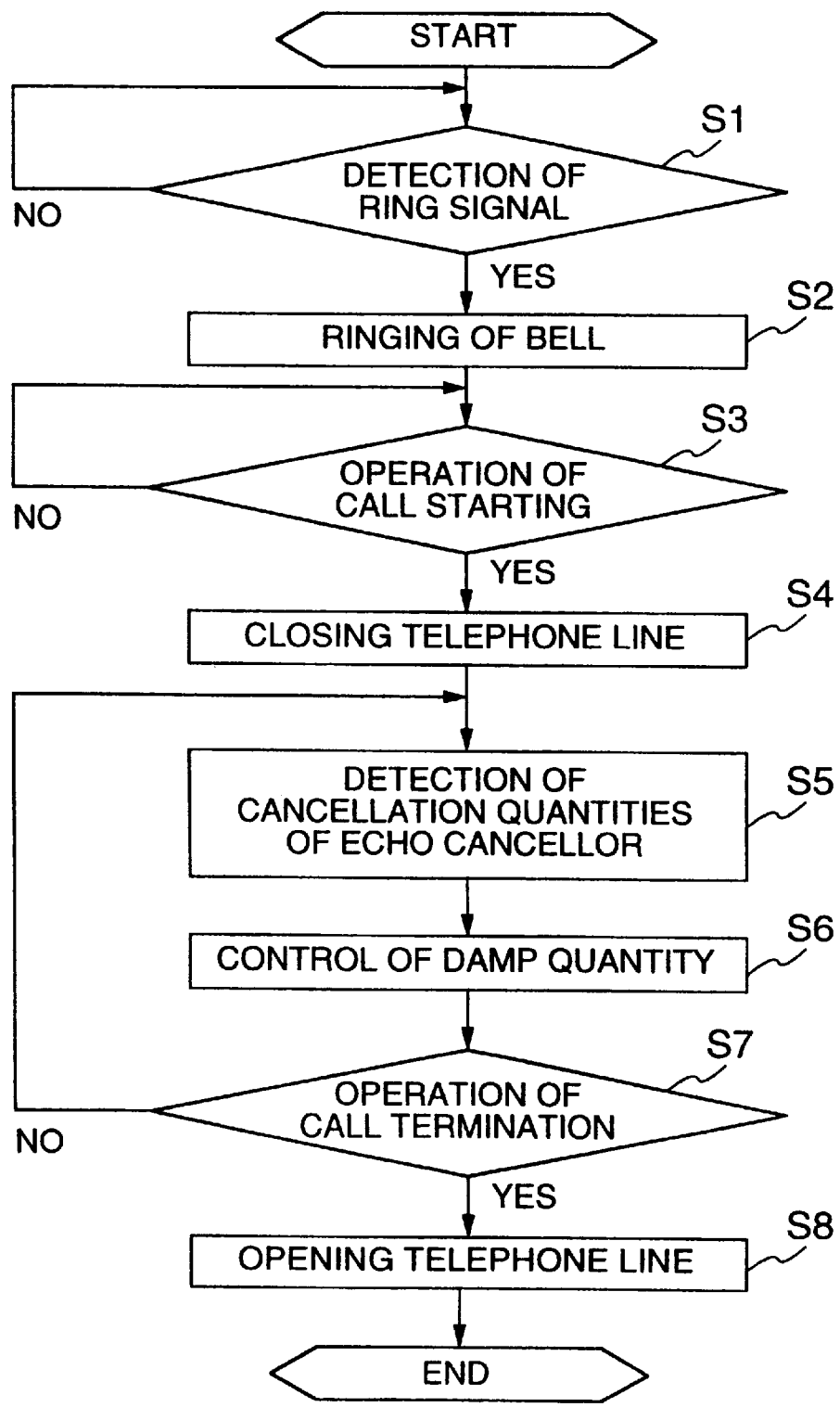
FIG. 5 is a flow chart which shows a hand free call operation of the telephone apparatus shown in FIG. 4.
Figure 6:
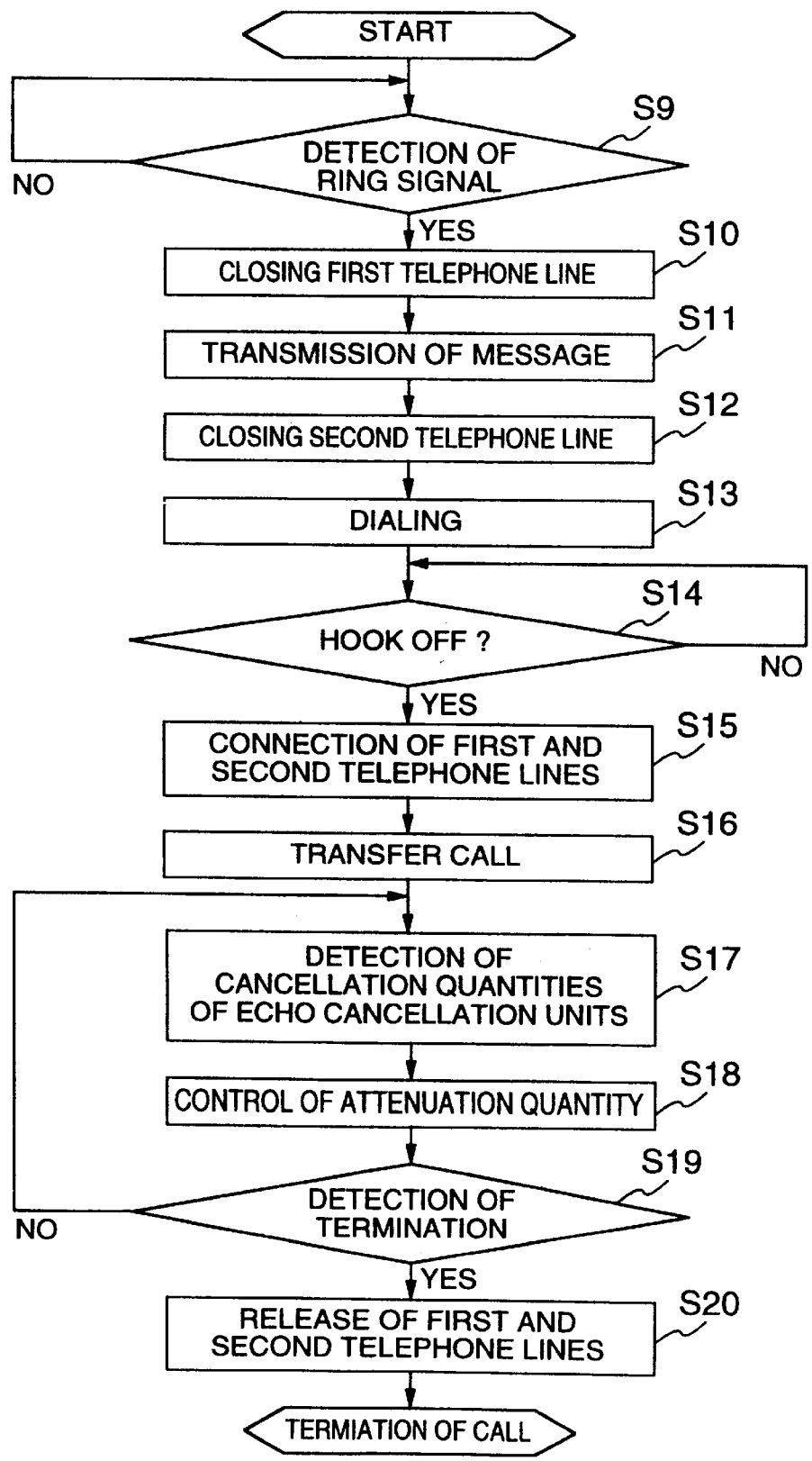
FIG. 6 is a flow chart which shows the operation of the telephone apparatus shown in FIG. 4 at the time of a transfer.

FIGS. 5 and 6 are flow charts which show the operation of the telephone apparatus of the present embodiment, and FIG. 3 is a block diagram which shows the telephone line at the time of the transfer operation. Referring to FIG. 5, on the operation of the telephone apparatus of the present embodiment during a hand-free call mode will be explained.

When the ring signal is coming through the first telephone line 1, the first bell detector 5 detects the ring signal in step S1. The detection signal is output to the control unit 33, and then the control unit 33 controls a bell sound source and so forth (not shown) to ring a bell in step S2.

When the called person operates to start the hand free call by a switch and so forth (not shown) in step S3, the first telephone line 1 is closed by the first circuit interface 3 in step S4, and both of the first switch 31 and the second switch 32 are switched to the terminal a. As a result, the hand free call using the microphone 28 and the loud speaker 29 is started.

The reception signal from the first telephone line 1 is input to the audio signal processor 27 through the first circuit interface 3, the first switch 31, and the first signal input terminal 38. The level of the reception signal is controlled to be a predetermined level by the first level setting unit 34 in the audio signal processor 27. The reception signal output from the first level setting unit 34 is output to the speaker 29 through the first signal output terminal 39 and the second switch 32.

The speech signal input by the microphone 28 is output to the audio signal processor 27 through the second switch 32 and the second signal input terminal 41. The level of the speech signal is controlled to be a predetermined level by the second level setting unit 35 in the audio signal processor 27. The speech signal output from the second level setting unit 35 is output to the calling person through the second signal output terminal 40, the first switch 31, the first circuit interface 3, and the first telephone line 1.

As acoustic coupling happens slightly between the speaker 29 and the microphone 28, the sound output from the speaker 29 goes around to the microphone 28. The first echo cancellation unit 37 cancels a going-around signal component in order to prevent the going-around signal component from being output to the first telephone line 1 as the transmission signal. The first echo cancellation unit 37 takes in the same signal as that output to the speaker 29 and performs on this signal the filtering equivalent to the acoustic coupling between the speaker 29 and the microphone 28. The output signal of the first echo cancellation unit 37 is subtracted from the signal input from the microphone 28. The signal input from the speaker 29 to the microphone 28 can be canceled by this subtraction processing.

The signal output from the audio signal processor 27 to the first switch 31 is slightly reflected in the first circuit interface 3, so that the reflected signal returns to the audio signal processor 27 as a side-tone. In order to prevent the side-tone from being output to the speaker 29, the second echo cancellation unit 36 cancels the signal returning as the side-tone. In the second cancellation unit 36 as well as in the first echo cancellation unit 37, a filtering equivalent to a side-tone circuit is performed on the signal which is output to the first switch 31. The signal reflected in the first circuit interface 3 can be canceled by subtracting the output signal of the second echo cancellation unit 36 from the signal input from the first switch 31.

In the reception mode, the amplification factor of the first level setting unit 34 is set to a predetermined value A in order to amplify the input signal to a level enough for the reception signal in the audio signal processor 27. The amplification factor of the second level setting unit 35 is set to a predetermined value b in order to prevent howling due to the acoustic coupling of the speaker 29 and the microphone 28 from occurring. In the transmission mode, the amplification factor of the second level setting unit 35 is set to a predetermined value B in order to amplify the input signal to a level enough for the transmission signal in the audio signal processor 27. The amplification factor of the first level setting unit 34 is set to a predetermined value a in order to prevent howling due to the side-tone of the transmission input from occurring.

The control unit 33 decides the change-over of the reception and transmission modes. The control unit 33 detects the ratio of the level of the signal input from the side of the first switch 31 to that of the signal input from the side of the second switch 32 to decide the change-over of the reception and transmission modes on the basis of a result of the comparison. For example, when the level of the signal input from the side of the first switch 31 is larger than that of the signal input from the side of the second switch 32, the control unit 33 changes over to be in the reception mode. Conversely, when the level of the signal input from the side of the second switch 32 is larger than that of the signal input from the side of the first switch 31, the control unit 33 changes over to be in the transmission mode.

At the time that the call starts, the value A is set to be larger than the value a (i.e. A>a) in the first level setting unit 34, and the value B is set to be larger that the value b (i.e. B>b) in the second level setting unit 35. That is, in the reception mode, the speech signal input from the microphone 28 to the audio signal processor 27 is damped in comparison with the transmission mode. In the transmission mode, the speech signal input to the audio signal processor 27 as the side-tone is damped in comparison with the reception mode.

The amplification factor a of the first level setting unit 34 in the transmission mode and the amplification factor b of the second level setting unit 35 in the reception mode are controlled by the control unit 33 according to the cancellation quantities of the second echo cancellation unit 36 and first echo cancellation unit 37, respectively.

For example, the cancellation quantity of the second echo cancellation unit 36 is increased as the training of the second echo cancellation unit 36 is advanced. It is controlled so that the amplification factor a of the first level setting unit 34 in the transmission mode is increased (steps S5 and S6). Conversely, the cancellation quantity of the first echo cancellation unit 37 is increased as the training of the first echo cancellation unit 37 is advanced. It is controlled so that the amplification factor b of the second level setting unit 35 in the reception mode is increased (steps S5 and S6).

Finally, when the cancellation quantities of the first and second echo cancellation units 37 and 36 become large sufficiently, the amplification factors of the first and second level setting units 34 and 35 come to satisfy the relation of A=a and B=b, so that it is possible to perform complete two-way calls.

In order to terminate the call, the called person operates to terminate the call by the switch and so forth (not shown) in step S7. In accordance with this operation, the first telephone line 1 is opened by the first circuit interface 3 in step S8 to terminate the call condition.

The case where the ring signal is input from the first telephone line 1 has been explained. However, in the case where the ring signal is input from the second telephone line 2, it is possible to perform the operation similar to that in the former case by selecting the side b of the first switch 31.

Next, referring to FIG. 6, the operation of the telephone apparatus of the present embodiment in the transfer mode will be explained.

When the ring signal is input through the first telephone line 1, the first bell detector 5 detects the ring signal in step S9. The detection signal is output to the control unit 33. The control unit 33 controls the first circuit interface 3 to close the first telephone line 1 in step S10. When the first telephone line 1 is closed, a message transmission unit (not shown) transmits the message "conducting transfer presently" for example, to the calling person through the first telephone line 1 in step S11. The control unit 33 controls the second circuit interface 4 to close the second telephone line 2 in step S12, and dials a previously registered phone number in step S13.

When the second circuit interface 4 detects that a partner on the side of the second telephone line 2 has taken his/her telephone set off hock, the detection signal is output to the control unit 33 in step S14. In accordance with the detection signal, the control unit 33 connects the first circuit interface 3 and the second circuit interface 4 through the audio signal processor 27 by selecting the side b of the second switch 32 and by selecting the side a of the first switch 31 in step S15. Thus, the call is enabled between the first telephone line 1 and the second telephone line 2 in step S16.

The case where the speech signal from the first telephone line 1 is larger is defined as a first telephone line reception mode. The case where the speech signal from the second telephone line 2 is larger is defined as a second telephone line reception mode. In the audio signal processor 27, in the first telephone line reception mode, the amplification factor of the first level setting unit 34 is set to a predetermined value C in order to compensate for circuit loss of the telephone line, and the amplification factor of the second level setting unit 35 is set to a predetermined value d in order to prevent oscillation due to the side-tone from the second circuit interface 4 from occurring.

Conversely, in the second telephone line reception mode, the amplification factor of the second level setting unit 35 is set to a predetermined value D in order to compensate for the circuit loss of the telephone line, and the amplification factor of the first level setting unit 34 is set to a predetermined value c in order to prevent oscillation due to the side-tone from the first circuit interface 3 from occurring.

The change-over of the first and second telephone line reception modes is decided by the control unit 33 on the basis of the ratio of the level of the signal input from the side of the first telephone line 1 to that of the signal input from the side of the second telephone line 2. For example, when the level of the signal input from the side of the first telephone line 1 is larger than that of the signal input from the side of the second telephone line 2, the control unit 33 changes over to be in the second telephone line reception mode, and conversely, when the latter is larger than the former, the control unit 33 changes over to be in the first telephone line reception mode.

At the time of the call start, the amplification factors c, d, C, and D are set so as to satisfy the relations C>c and D>d. That is, in the first telephone line reception mode, the speech signal input to the audio signal processor 27 from the second circuit interface 4 is damped in comparison with in the second telephone line reception mode, and in the second telephone line reception mode, the speech signal input to the audio signal processor 27 from the first circuit interface 3 is damped in comparison with the first telephone line reception mode.

The amplification factors c and d are controlled in accordance with the cancellation quantities of the first and second echo cancellation units 37 and 36 as well as in the hand free call mode. That is, when the cancellation quantities are increased as the training of the first and second echo cancellation units 37 and 36 is advanced, the amplification factors c and d are increased in steps S17 and S18. When the cancellation quantities finally become sufficiently large, the amplification factors of the first and second level setting units 34 and 35 are controlled so as to satisfy the relations C=c, D=d.

When the call is terminated and the first circuit interface 3 or the second circuit interface 4 detects that the speaker on the side of the first telephone line 1 or the speaker on the side of the second telephone line 2 has placed his/her telephone set on hook in step S19, the control unit 33 controls the first and second circuit interfaces 3 and 4 to release the first and second telephone lines 1 and 2 in step S20.

Referring to FIG. 3 on one example will be explained of the method of setting the amplification factor C explained above. The first and second telephone lines 1 and 2 which are connected to the telephone apparatus S are connected to the switching system Ex1. The telephone sets P and Q are connected to the switching systems Ex2 and Ex3 through the telephone lines 24 and 25, respectively.

When a telephone call from the telephone set P is transferred to the telephone set Q by the telephone apparatus S, the signal from the telephone set P is sent to the switching system Ex1 through the telephone line 24 and the switching system Ex2, and then is sent to the telephone apparatus S from the switching system Ex1 through the first telephone line 1. And then, the signal is sent to the telephone set Q through the second telephone line 2, the switching system Ex1, the switching system Ex3, and the telephone line 25. In this case, the signal from the telephone set P is damped by the telephone lines 24, 1, 2, and 25.

When the ratio of the damping in the first telephone line 1 and the damping in the second telephone line 2 is set as the amplification factor C of the first level setting unit 34 of the telephone apparatus S, the signal output from the switching system Ex1 to the first telephone line 1 is input from the switching system Ex1 to the second telephone line 2 without being damped. By this setting, it is possible to perform a conversation with the same volume as that in the case where the telephone sets P and Q are connected directly through the switching system Ex1, because only the damping in the telephone lines 24 and 25 is occurred between the telephone sets P and Q during the above transfer operation.

In the telephone apparatus S, it is assumed that it becomes in the call condition when the dialing signal sending operation is performed from the first telephone line 1 to the second telephone line 2. Here, it is assumed that there is no signal damping in the first and second circuit interfaces 3 and 4 in the case where a signal of level K is generated on the side of the first telephone line 1 and a signal of level L is transmitted from the side of the second telephone line 2. The amplification factor C can be obtained on the basis of the equation C=K−L. Also, if the input-output characteristics of the first and second circuit interfaces 3 and 4 are equal, the amplification factor C can be set so as to be equal to the amplification factor D, i.e. C=D.

In the aforementioned explanation, when the ring signal was input from the first telephone line 1 in the transfer mode, it was explained that the first telephone line 1 is closed and then the dialing signal is sent to the second telephone line 2. However, it is possible to obtain the same effects by performing the following operation. When the ring signal is input from the first telephone line 1, the dialing signal is sent to the second telephone line 2 without closing the first telephone line 1. And then, the first telephone line 1 is closed when the speaker on the side of the second telephone line 2 takes his/her telephone set off hook, so that the first circuit interface 3 and the second circuit interface 4 are connected through the audio signal processor 27.

Further, although the transfer operation from the first telephone line 1 to the second telephone line 2 is explained, the transfer operation from the second telephone line 2 to the first telephone line 1 can be performed similarly.

Although the operation with regard to two telephone lines is explained in the present embodiment, with regard to more than 3 telephone lines, it is possible to perform the same operation by combining two telephone lines among them.

Further, in the present embodiment, the change-over signal level ratio of the amplification factors A and B and the amplification factors C and D or the reception/transmission modes and the first telephone line reception/second telephone line reception modes is set at the same time when the hand free call mode and the transfer mode are changed over, so that it is possible to perform the optimal signal level setting and stable change-over operation.

By composing the audio signal processor 27 with a digital integrated circuit known as a DSP (digital signal processor) and so forth, the processor can be easily obtained and the change-over of setting can be easily done.

As described above, according to the present embodiment, the hand free call mode and the transfer mode can be realized by the same audio signal processor 27, so that the effect that the hand free call and the transfer function can be realized without enlarging the circuit scale can be obtained.

What is claimed is:

1. A telephone apparatus which is connected to a plurality of telephone lines and has a transfer function for transferring a call among said plurality of telephone lines, comprising:

circuit interfaces each having a 2–4 line substitution function and for conducting an interface function between each of said plurality of telephone lines and a telephone apparatus internal circuit;

a first amplifier for amplifying a signal from a first telephone line;

a second amplifier for amplifying a signal from a second telephone line;

speech input/output means including speech input means for converting speech to an audio signal and speech output means for outputting an audio signal as speech;

change-over means having a change-over function for change over of a speech path so as to send the signal amplified by said first amplifier to said speech output means and so as to send a signal from said speech input means to said second amplifier in a first condition, and for change over of said speech path so as to send the signal amplified by said first amplifier to said second telephone line and so as to send said signal from said second telephone line to said second amplifier in a second condition;

first echo cancellation means for generating a first cancellation signal for canceling a first return signal when a part of the signal amplified by said first amplifier returns;

second echo cancellation means for generating a second cancellation signal for canceling a second return signal when a part of the signal amplified by said second amplifier returns; and control means; wherein said control means controls as follows:
 (a) to set said change-over means to be in said first condition when a hand free call mode is set up, and to set said change-over means to be in a second condition when a transfer mode is set up;
 (b) to compare a level of the signal input to said first amplifier and a level of the signal input to said second amplifier;
 (c) to set an amplification factor of one of said first and second amplifiers, which is on a side of a speech path in which the level of the signal is larger, to a first value, and to set an amplification factor of the other amplifier to a value lower than said first value, in said hand free call mode; and
 (d) to set an amplification factor of one of said first and second amplifiers, which is on a side of a speech path in which the level of the signal is larger, to a second value, and to set an amplification factor of the other amplifier to a value lower than said second value, in said transfer mode.

2. A telephone apparatus which is connected to a plurality of telephone lines and has a transfer function for transferring a call among said plurality of telephone lines, comprising:

circuit interfaces each having a 2–4 line substitution function and for conducting an interface function between each of said plurality of telephone lines and a telephone apparatus internal circuit;

a first amplifier for amplifying a signal from a first telephone line;

a second amplifier for amplifying a signal from a second telephone line;

speech input/output means including speech input means for converting speech to an audio signal and speech output means for outputting an audio signal as speech;

change-over means having a change-over function for change over of a speech path so as to send the signal amplified by said first amplifier to said speech output means and so as to send a signal from said speech input means to said second amplifier in a first condition, and for change over of said speech path so as to send the signal amplified by said first amplifier to said second telephone line and so as to send said signal from said second telephone line to said second amplifier in a second condition;

first echo cancellation means for generating a first cancellation signal for canceling a first return signal when a part of the signal amplified by said first amplifier returns;

second echo cancellation means for generating a second cancellation signal for canceling a second return signal when a part of the signal amplified by said second amplifier returns; and control means; wherein said control means controls as follows:
 (a) to set said change-over means to be in said first condition when a hand free call mode is set up, and to set said change-over means to be in said second condition when a transfer mode is set up;
 (b) to set amplification factors of said first and second amplifiers to a first value and a second value, respectively, when a level of the signal input to said first amplifier is larger, and to set the amplification factors of said first and second amplifiers to a third value and a fourth value, respectively, when a level of the signal input to said second amplifier is larger, in said hand free call mode; and
 (c) to set amplification factors of said first and second amplifiers to a fifth value and a sixth value, respectively, when the level of the signal input to said first amplifier is larger, and to set the amplification factors of said first and second amplifiers to a seventh value and an eighth value, respectively, when the level of the signal input to said second amplifier is larger, in said transfer mode.

3. A telephone apparatus which is connected to a plurality of telephone lines and has a transfer function for transferring a call among said plurality of telephone lines, said plurality of telephone lines including first and second telephone lines, comprising:

circuit interfaces each having a 2–4 line substitution function and for conducting an interface function between each of said plurality of telephone lines and a telephone apparatus internal circuit;

a first amplifier for amplifying signals from said plurality of telephone lines;

a second amplifier for amplifying the signals from said plurality of telephone lines;

change-over means having a change-over function for change over of a speech path so as to send a signal from said first telephone line to said first amplifier and to send the signal amplified by said first amplifier to said second telephone line, and so as to send a signal from said second telephone line to said second amplifier and to send the signal amplified by said second amplifier to said first telephone line, in a transfer mode;

first echo cancellation means for generating a first cancellation signal for canceling a first return signal when a part of the signal amplified by said first amplifier returns;

second echo cancellation means for generating a second cancellation signal for canceling a second return signal when a part of the signal amplified by said second amplifier returns; and control means, wherein when the transfer mode is set, said control means controls as follows:
  (a) to compare a level of a signal inputted to said first amplifier and a level of a signal inputted to said second amplifier, and
  (b) to set an amplification factor of one of said first and second amplifiers, which is on a side of a speech path in which the level of the signal is larger, to a predetermined value, and to set an amplification factor of the other amplifier to a value lower than said predetermined value.

4. A telephone apparatus, comprising:

a hand-free speech input/output unit which includes a speaker and a microphone;

a first amplifier in a first signal path between a telephone line and the speaker, the first amplifier having an amplification factor;

a second amplifier in a second signal path between the microphone and the telephone line, the second amplifier having an amplification factor;

an echo cancellation unit connected between the first and second signal paths, the echo cancellation unit generating an echo cancellation signal that is supplied to the second signal path;

means for comparing the level of a signal which is input to the first amplifier via the first signal path and the level of a signal which is input to the second amplifier via the second signal path to determine which amplifier is receiving the largest-level signal; and means for setting the amplification factor of the first amplifier higher than the amplification factor of the second amplifier if the first amplifier is receiving the largest-level signal and for setting the amplification factor of the second amplifier higher than the amplification factor of the first amplifier if the second amplifier is receiving the largest-level signal.

5. The telephone apparatus of claim 4, wherein the echo cancellation signal is subtracted from a signal generated by the microphone to provide a difference signal, the difference signal being amplified by the second amplifier.

6. The telephone apparatus of claim 5, wherein the echo cancellation unit has an input terminal that receives the signal amplified by the first amplifier.

7. The telephone apparatus of claim 4, further comprising another echo cancellation unit connected between the first and second signal paths, the second echo cancellation unit generating an echo cancellation signal that is supplied to the first signal path.

8. A telephone apparatus, comprising:

first amplifier in a first signal path between a first input terminal and a first output terminal, the first amplifier having an amplification factor;

a second amplifier in a second signal path between a second input terminal and a second output terminal, the second amplifier having an amplification factor;

a first echo cancellation unit connected between the first and second signal paths, the first echo cancellation unit generating an echo cancellation signal that is supplied to the second signal path;

a second echo cancellation unit connected between the first and second signal paths, the second echo cancellation unit generating an echo cancellation signal that is supplied to the first signal path;

first switch means for connecting both the first input terminal and the second output terminal to either a first telephone line or a second telephone line;

a speech input/output unit;

second switch means for connecting both the first output terminal and the second input terminal to either the second telephone line or the speech input/output unit;

means for comparing the level of a signal which is input to the first amplifier via the first signal path and the level of a signal which is input to the second amplifier via the second signal path to determine which amplifier is receiving the largest-level signal; and means for setting the amplification factor of the first amplifier higher than the amplification factor of the second amplifier if the first amplifier is receiving the largest-level signal and for setting the amplification factor of the second amplifier higher than the amplification factor of the first amplifier if the second amplifier is receiving the largest-level signal.

9. The telephone apparatus of claim 8, wherein the speech input/output unit comprises a speaker and a microphone which permit hand free communication via the telephone apparatus when the second switch means connects the first output terminal and the second input terminal to the speech input/output unit.

10. The telephone apparatus of claim 8, wherein the amplification factors set by the means for setting when the second switch means connects the first output terminal and the second input terminal to the speech input/output unit are different from the amplification factors set by the means for setting when the second switch means connects the first output terminal and the second input terminal to the second telephone lines.

* * * * *